United States Patent [19]

Wittfoht

[11] 4,352,220

[45] Oct. 5, 1982

[54] METHOD FOR THE CONSTRUCTION OF A CABLE-STAYED OR REIN-GIRTH BRIDGE

[75] Inventor: Hans Wittfoht, Kelkheim, Fed. Rep. of Germany

[73] Assignee: Polensky & Zollner, Frankfurt am Main, Fed. Rep. of Germany

[21] Appl. No.: 181,963

[22] Filed: Aug. 28, 1980

[30] Foreign Application Priority Data

Sep. 20, 1979 [DE] Fed. Rep. of Germany ....... 2938029

[51] Int. Cl.³ .............................................. E01D 1/00
[52] U.S. Cl. ...................................................... 14/1
[58] Field of Search ..................... 14/1, 18, 19, 20, 23, 14/73, 77

[56] References Cited

U.S. PATENT DOCUMENTS

| | | | |
|---|---|---|---|
| 746,679 | 12/1903 | Cross et al. ........................... | 14/19 |
| 1,235,627 | 8/1917 | Woodward ........................... | 14/19 |
| 2,413,019 | 12/1946 | Wolfard ................................ | 14/19 |
| 3,259,932 | 7/1966 | Patin ..................................... | 14/18 |
| 3,673,624 | 7/1972 | Finsterwalder ...................... | 14/19 |
| 3,677,189 | 7/1972 | Appelt .................................. | 14/19 |
| 3,745,601 | 7/1973 | Appelt .................................. | 14/77 |
| 3,882,564 | 5/1975 | Muller .................................. | 14/77 |
| 3,953,980 | 5/1976 | Bennett ................................ | 14/18 X |
| 4,062,081 | 12/1977 | Ramer ................................... | 14/1 |

FOREIGN PATENT DOCUMENTS

| | | | |
|---|---|---|---|
| 2036924 | 3/1971 | Fed. Rep. of Germany .......... | 14/77 |
| 2056100 | 5/1971 | Fed. Rep. of Germany .......... | 14/77 |
| 1558417 | 1/1969 | France .................................. | 14/77 |

*Primary Examiner*—Nile C. Byers, Jr.
*Attorney, Agent, or Firm*—Meyer, Tilberry & Body

[57] ABSTRACT

Method for the construction of a cable-stayed or rein-girth bridge in which the stiffening beam is built together with the guying provided for the final state by the cycle-pushing method and brought into its final position. The guying takes over in this case the support of the stiffening beam during mounting and displacement of the bridge, so that temporary supports between the bridge piers and a temporary guying at the front end of the super-structure are not required.

6 Claims, 9 Drawing Figures

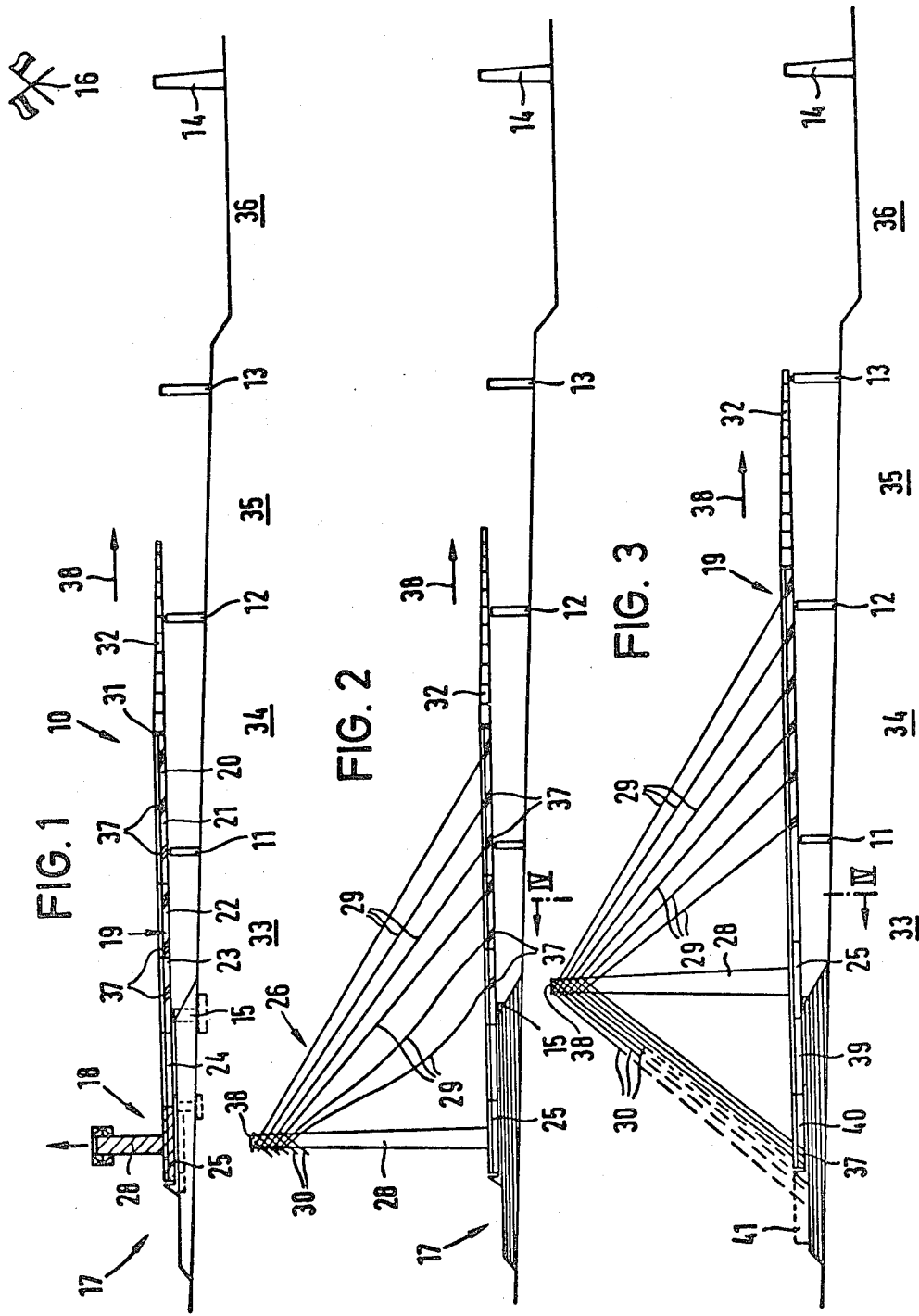

METHOD FOR THE CONSTRUCTION OF A CABLE-STAYED OR REIN-GIRTH BRIDGE

The invention is concerned with a method for the construction of a cable-stayed or rein-girth bridge, particularly of steel-reinforced or prestressed concrete, in which the stiffening beam is built in sections remote from the site of installation, the sections consecutively joined together and moved step by step into final position with the progress of the construction.

BACKGROUND

A method for the construction of a rein-girth bridge is known (DE-AS No. 27 54 213) in which first the stiffening girder is produced by a cycle-pushing method and then brought into its final position. Subsequently the pylon is built and the reins are attached for the final guying. In such a system, a bridge having larger spans requires temporary supports underneath the stiffening girder until the guying is completed and anchored and capable of taking over the support function assigned to it.

In the cycle-pushing method, it is known to use a temporary guying in form of an additional support (DE-OS No. 27 03 822). In such a setup, with the displacement of the stiffening beam, the cantilevering part of the bridge is stayed by means of a temporary pylon which is set upon the stiffening beam. In this manner the cantilevering bridge part is held during its advancement, so that less temporary supports are required. The auxiliary pylon and the temporary guying are then removed after the completion of the bridge.

THE INVENTION

It is the task of the invention to facilitate the construction of a cable-stayed or rein-girth bridge, so that auxiliary supports and temporary guing can be dispensed with to a large extent.

This problem is solved by the invention in that the parts belonging to the final guying are produced together with the stiffening beam sections as far as possible and appropriately set into action and advanced together with the stiffening beam.

Such a method offers the advantage that the final guying of the supporting structure is already available during the manufacturing and advancing procedure. Moreover, it is considerably simpler to produce and finish-mount on land the guying constructions provided for the bridge in its final position together with the individual sections of the stiffening beam than when the bridge rests on piers over water or above a deep valley.

It is particularly suitable when a central pylon carrying the tension members of the guying is built at the same time as the section of the stiffening beam belonging to it and advanced together with the stiffening beam. In this case the pylon provided for the final state can be used for carrying the guying, which pylon is set down after reaching its final position either directly or over the stiffening beam on the bridge pier, abutment or the like assigned to it. When moved from the land base to the final position, the kind of load-bearing and the construction of the bridge are unaltered from that seen in the final state.

The mounting of the pylon provided for the final state together with prefabrication of part of the stiffening beam assigned to it at the site of construction at the end of the bridge is feasible in a simple manner in a form of bridge construction in which the pylon is arranged centrally of the superstructure of the bridge, preferably in the longitudinal axis of the bridge. In this arrangement the guying can lie in the vertical plane going through the bridge axis. It can, however, also run from the pylon symmetrically or asymmetrically toward both longitudinal sides and is there fastened on the stiffening beam. After the displacement of the stiffening beam into its final position, the centrally arranged pylon or the section of the superstructure carrying it has then only to be deposited on the bridge pier provided for this purpose and to be connected with the support body.

In the case of constructional designs in which the pylon in the final state is in the form of a triangular or rectangular trestle disposed on both sides of the stiffening truss, it is more suitable to use an temporary pylon for carrying the guying, which pylon is set upon the section of the stiffening beam belonging to the final pylon and moved forward together with it up to the site where the final pylon is erected. Subsequently the guying anchor-construction at the upper end of the temporary pylon is then disengaged and fastened at the upper end of the final pylon. In this arrangement the guying provided for the final state acts likewise upon the stiffening truss in its forward motion and is supported by the temporary pylon. Lateron the load of the guying is transferred to the pylon provided for the final state when the stiffening beam has reached its final position. The temporary pylon can then be removed.

In the last-mentioned method according to the invention it is particularly suitable to arrange the top anchorage of the guying in a headpiece which is provisionally mounted on the upper end of the temporary pylon and then transferred to the upper end of the final pylon as a complete assembly when detached from the temporary pylon as soon as the temporary pylon is located in the area of the final pylon. This offers the advantage that the top anchorage of the guying at the upper end of the pylon can also be mounted in its final form on land if, in the displacement of the stiffening beam, a temporary pylon has to be used. When the stiffening beam stayed with the final cables or rein girths by means of the temporary pylon has reached its final position and the temporary pylon is located in the area of the pylon erected for the final state, it is only necessary to switch the headpiece from the temporary pylon to the final pylon. The guying in this transfer does not change its position and no variation of forces occurs in the guying when the final pylon takes over the load from the temporary pylon. In this arrangement the temporary pylon can be brought between two supports standing opposite each other of a triangular or rectangular pylon provided for the final state whose upper support ends have closely arranged parts between which is fitted the headpiece supporting the guying.

In order to make allowance for the varying stresses of the stiffening beam in the displacement, the tensile forces active in the tension members can be altered during the displacement of the stiffening beam and adjusted to equal the effective forces corresponding to its position at the time.

The method according to the invention offers the advantage that neither temporary supports between the piers nor a temporary guying for the front end of the stiffening beam are required during the forward motion since the final guying is wholly load-bearing during the mounting and advancing procedure. This leads to lower construction costs and the time required for the construction is considerably shortened.

OBJECTS

The principal object of the invention is the provision of a new and improved method of constructing a cable-stayed or rein-girth bridge which is relatively simple to carry out and enables the construction of the bridge in a more economical fashion than heretofore.

Another object of the invention is the provision of a new and improved method of constructing a cable-stayed or rein-girth bridge wherein the final support for the main pylon is constructed in the area to be bridged and the entire bridge is constructed at a construction site adjacent to the area to be bridged and then moved as a rigid unit so that the pylon rests on said support.

Another object of the invention is the provision of a new and improved method of constructing a cable-stayed or rein-girth bridge wherein the stiffening beam is built in a construction site adjacent to the area where installed, then the sections are consecutively joined together and subsequently moved step by step into its final position when the construction is progressing and wherein the pylon for supporting the ultimate structure is constructed at the construction site and then moved onto its supporting pier along with the section with which it is associated.

Another object of the invention is the provision of a new and improved method of constructing a cable-stayed or rein-girth bridge wherein the ultimate pylon is constructed on its ultimate support and the bridge consists of a plurality of sections in end-to-end relationship with a temporary supporting pylon and interconnecting tension cables being constructed at a point remote from the final pylon and then moved into position and the cables transferred from the temporary pylon to the final pylon.

DRAWINGS

Further characteristics and advantages of the invention become evident from the following description of the drawings in which preferred forms of execution of the invention are illustrated and in which:

FIGS. 1, 2 and 3 show in longitudinal section three different stages of construction of a cable-stayed bridge with a central pylon, built by the cycle-pushing method;

PREFERRED EMBODIMENTS

In the FIGS. 1, 2 and 3 is displayed a cable-stayed bridge under construction which overspans a flat valley and whose superstructure 10 is produced by the cycle-pushing method. In this setup the site of the bridge construction with the piers 11, 12, 13 and 14 is displayed only from an abutment 15 to the center 16 of the bridge; the superstructure continues, however, of course to the opposite right abutment, not shown here.

Figure 4:
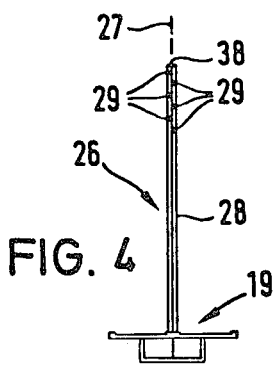
FIG. 4 shows the bridge according to FIG. 3 in a vertical section according to the line IV—IV of the FIG. 3.

At the left end 17 of the bridge and located behind the abutment 15 is a construction site 18 with concreting and mounting equipment, not shown in any detail, on which the stiffening beam 19 of the superstructure 10 is produced in consecutively joined-together sections 20, 21, 22, 23, 24 and 25. The stiffening beam 19 in the displayed example is a box type girder of prestressed concrete of rectangular cross section and a roadway atop, cantilevered on both sides. It is stiffened by a guying which is designated in its entirety by the number 26 and which consists in the example displayed in the FIGS. 1 to 4 of a central bridge pylon 28, arranged on the longitudinal median plane 27 (See FIG. 4) of the bridge, and fan-like radiating slant cables 29 and 30.

At the front end 31 of the stiffening beam 19 a light auxiliary truss 32 is fastened, the length of which is about as long as the span of the first bridge field 33 between the left abutment 15 and the first bridge pier 11. The space between the following bridge fields 34 and 35 as well as the first stream opening 36 between the piers 13 and 14 are larger. In the area of the river span the stiffening beam 19 is supported additionally by the cables 29, 30 which run over the pylon 28 which in the final state stands above the pier 14.

According to the invention the individual sections 20, 21, 22, 23, 24, 25 etc. are produced at the construction site on land one after the other. Simultaneously the sections of the stiffening beam are also provided with the anchorings 37 for the cables forming part of the guying 26. At the same time, the cables 29 and 30 respectively are fastened to the stiffening beam.

Every time when one section 20, 21, 22, 23, 24, 25 of the stiffening beam with the anchoring devices for the cables 29 is finished, the stiffening beam 19 and the auxiliary truss 32 mounted at the fore end 31 are advanced longitudinally to the right. The advance corresponds with the length of the newly completed section. When shifted in longitudinal direction the sections 20 to 24 of the stiffening truss are connected with each other to form a continuous bridge girder. This sectional production and advancement of the superstructure in the longitudinal direction of the bridge starting at one abutment is designated as "cycle-pushing method", which method is known from the prior patents referred to herein.

Then when the section 25 of the stiffening beam 19 (which in the final state is situated above the pier 14) is constructed, the pylon 28 at whose upper end 38 the cables 29 and 30 are to be anchored (FIGS. 1 and 2), is erected on the section 25 also at the construction site 18. After further displacement of the superstructure 10 to the right, the subsequent sections 39 and 40 are produced and connected and tensioned against the already finished part of the stiffening beam 19. At the same time cables 30 are fastened to the sections 40 and 41 of the superstructure.

The cables 29 and 30 of the guying can then be tightened so that the guying 26 is made loadbearing, in which setup the tensile forces active in the cables 29 and 30 of the guying 26 are suitably adjusted to the specific position of the stiffening beam 19.

One recognizes in FIG. 3 that the final guying 26 is effective when the stiffening beam 19 spans the second field 34 of the superstructure, so that temporary supports in the fields 34, 35 and 36 and the following fields are not required. In general the auxiliary truss 32 at the front end of the stiffening beam is required only when advancing the stiffening beam over the first fields 33 and 34, in other words as long as the guying 26 is not yet loadbearing.

As soon as the stiffening beam 19 is constructed in its full length and advanced together with the guying 26 until pylon 28 is located over the pier 14, the section 25 is deposited together with the pylon 28 on the pier 14 and connected with the pier bearing, not shown. The superstructure of the bridge is then completely finished and in place.

Figure 5:
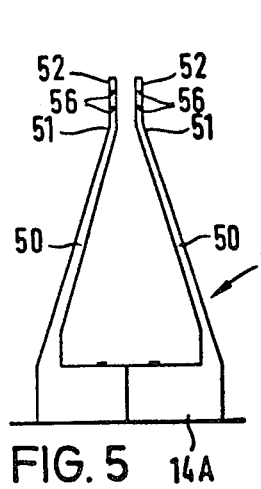
FIGS. 5, 6 and 7 show another example of execution of a cable-stayed bridge with a triangular pylon embracing the stiffening beam in a cross section analogous to the FIG. 4 in three different states of construction.
Figure 6:
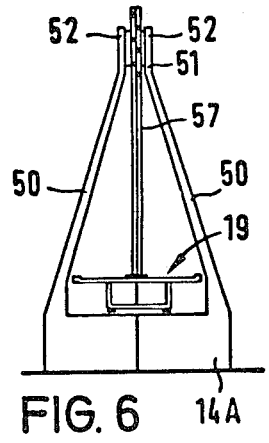
Figure 7:
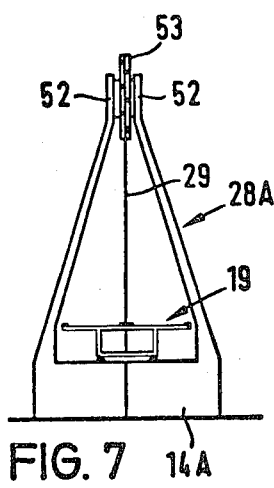

In the embodiment shown in the FIGS. 5 to 7, the pylon 28A has a triangular shape and is erected directly on the pier 14A. Its two slanted supports set up opposite each other are situated on each side of the stiffening truss 19 supporting on the head vertical parts 52 extending parallel to each other in a predetermined distance apart. Between these parts 52 a headpiece 53 is provided in which are anchored the cables 29 and 30 by means of terminations 54. The headpiece 53 can be fastened with bolts or other fittings at the upper ends of the supports. The bolts are passed through holes 55 in the headpiece 53 and through holes 56 in the upper ends of the supports and can be secured by nuts or any other means.

The construction of the individual sections of the stiffening truss is made in the same way as it has been described with respect to the embodiment according to the FIGS. 1 to 3, that is to say the cables 29 and 30 are fastened on these stiffening-truss sections. However, a temporary pylon 57 is placed on section 25 of the stiffening beam 19 with the headpiece 53 and the cables 29 and 30 secured at the top of the temporary pylon 57. During the advancement of the superstructure 10 in the direction of the arrow 38, the final guying consisting of the cables 29 and 30 and the headpiece 53 is carried by the temporary pylon 56 which is supported on the section 25 of the stiffening truss 19.

When the section 25 of the superstructure arrives at pier 14, the headpiece 53 at the top of the temporary pylon 57 slips between the two vertical parts 52 of the final pylon 28A. The headpiece 53 is then changed over, that is to say it is fastened on the parts 52 at the top of the pylon 28A and subsequently detached from the temporary pylon 57 (FIG. 6). The triangular pylon 28A provided for the final state then takes over the load of the cables 29 and 30 and the temporary pylon 57 can be removed (FIG. 7).

Figure 8:
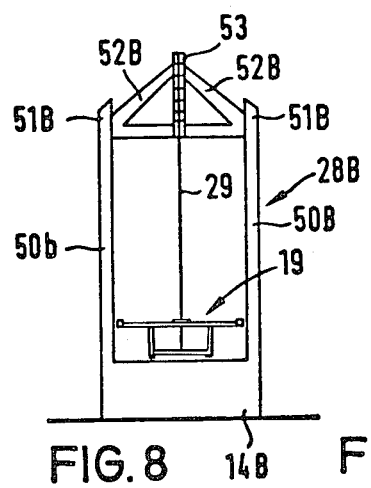
FIG. 8 shows a third form of execution of a cable-stayed bridge with a rectangular pylon embracing the stiffening beam in vertical cross section analogous to FIG. 4; and, FIG. 9 shows the headpiece for the top anchorage of the guying on the upper end of a pylon in a lateral view.
Figure 9:
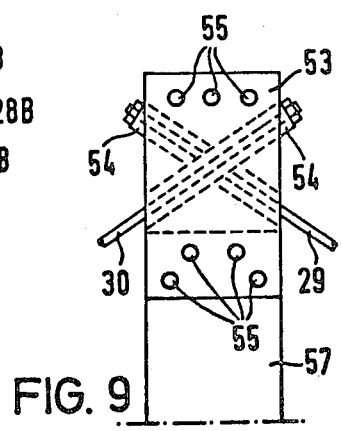

In FIG. 8 a similar embodiment is shown in which the pylon 14B has a rectangular shape and is erected directly on the pier 14B in the same manner as described according to the FIGS. 5 to 7. At the top 51B of the supports 50B are secured two triangular parts 52b spaced so that the headpiece 53 can be secured thereon carrying the cables 29 and 30 which are arranged in the longitudinal median plane of the bridge and support the stiffening beam 19.

The invention is not limited to the described embodiments. The method according to the invention is also applicable for the construction of rein girth bridges which have only individual reins in place of several slant cables. Furthermore, the invention of course is also usable in bridges with several pylons, which may be rein-girth bridges of cable-stayed bridges. Moreover, the method according to the invention can also be successfully applied in case of bridges having an other guying i.e. in form of chains or the like.

Having thus described my invention, I claim:

1. A method of constructing a cable-stayed or rein-girth bridge having opposite ends and including stiffening beam means comprised of a plurality of beam sections in ridgidly joined end-to-end relationship between said opposite ends, pylon means extending upwardly relative to a given one of said beam sections between said ends and having an upper end, a plurality of tension means extending from said pylon means to spaced locations along said stiffening beam means, and upright pier means between said opposite ends and underlying said given one of said beam sections and said pylon means, comprising the steps of: constructing said pier means, constructing said beam sections individually at at least one of said opposite ends of said bridge and to include anchoring means for said tension means on beam sections forwardly and rearwardly of said given section with respect to the direction from said one end of said bridge toward the other, sequentially joining individual beam sections at said one end including said sections forwardly of said given section, supporting said joined sections at said one end and progressively displacing said joined sections in said forward direction, erecting upright support means at said one end of said bridge and on said given one of said beam sections, sequentially joining and progressively displacing additional beam sections in said forward direction including said sections rearwardly of said given section, securing said tension means to said upright support means while said given beam section is at said one end of said bridge and securing portions of said tension means to said anchoring means on said beam sections forwardly and rearwardly of said given section, and continuing to sequentially join and progressively displace beam sections in said forward direction until said given beam section and said upright support means thereon are positioned over said pier means.

2. The method according to claim 1, wherein said upright support means is a pylon permanently attached to said given beam section and providing said pylon means of said bridge.

3. The method according to claim 1, wherein said upright support means is a temporary pylon having an upper end, and including the further steps of erecting a permanent pylon on said pier means, said permanent pylon providing said pylon means of said bridge and having an upper end, transferring said tension means from said upper end of said temporary pylon to said upper end of said permanent pylon when said given beam section is positioned over said pier means, and removing said temporary pylon.

4. The method according to claim 3, wherein said upper end of said temporary pylon includes detachable head means to which said tension means is secured, said upper end of said permanent pylon including means for attaching said head means thereto, and transferring said tension means by detaching said head means from said temporary pylon and attaching said head means to said permanent pylon.

5. The method according to claim 4, wherein said means for attaching said head means to said permanent pylon includes supports on said permanent pylon spaced apart transverse to the direction between said opposite ends of said bridge, said head means being between said supports when said given beam section is over said pier means, fastening said head means to said supports on said permanent pylon, and then detaching said head means from said temporary pylon.

6. A method of constructing a cable-stayed or rein-girth bridge having opposite ends and including stiffening beam means comprised of a plurality of beam sections in rigidly joined end-to-end relationship between said opposite ends, pylon means extending upwardly relative to a given one of said beam sections between said ends and having an upper end, a plurality of tension means extending from said upper end of said pylon means to spaced locations along said stiffening beam means, and upright pier means between said opposite ends and underlying said given one of said beam sections and said pylon means, comprising the steps of: constructing said pier means, constructing said beam sections individually at at least one of said opposite ends of said bridge, sequentially joining individual beam sections at said one end, supporting said joined sections at said one end and progressively displacing said joined sections from said one end of said bridge toward the other, erecting upright support means at said one end of said bridge and on said given one of said beam sections, said upright support means having an upper end, securing said tension means to said upper end of said upright support means while said given beam section is at said one end of said bridge and securing a portion of said tension means to beam sections forwardly of said given section with respect to the direction from said one end of said bridge toward the other, sequentially joining and progressively displacing additional beam sections in said direction and securing another portion of said tension means to said additional beam sections, and continuing to sequentially join and progressively displace beam sections in said direction until said given beam section and said upright support means therein are positioned over said pier means, and fastening said given beam section to said pier means.

* * * * *